United States Patent [19]

Mishima et al.

[11] Patent Number: 5,054,241

[45] Date of Patent: Oct. 8, 1991

[54] DOOR GLASS WEATHER STRIP FOR VEHICLES

[75] Inventors: Kunio Mishima; Mitsuo Hamabata; Harumi Kogiso; Masahiro Nozaki, all of Aichi, Japan

[73] Assignee: Toyoda Gosei Co., Ltd., Nishikasugai, Japan

[21] Appl. No.: 588,995

[22] Filed: Sep. 26, 1990

[30] Foreign Application Priority Data

Sep. 30, 1989 [JP] Japan .............................. 1-115637[U]

[51] Int. Cl.⁵ .............................................. E06B 7/16
[52] U.S. Cl. ........................................ 49/488; 49/490; 49/495; 49/497
[58] Field of Search ................. 49/488, 490, 491, 495, 49/497, 480, 481

[56] References Cited

U.S. PATENT DOCUMENTS

| | | | |
|---|---|---|---|
| 4,584,793 | 4/1986 | Okada et al. | 49/488 |
| 4,656,784 | 4/1987 | Brachmann | 49/491 |
| 4,667,442 | 5/1987 | Hiramatsu et al. | 49/488 X |
| 4,694,611 | 9/1987 | Okumura | 49/488 X |
| 4,843,759 | 7/1989 | Kisanuki et al. | |

*Primary Examiner*—Philip C. Kannan
*Attorney, Agent, or Firm*—Cushman, Darby & Cushman

[57] ABSTRACT

In a door glass weather strip for vehicles which is made up of an installation member to be installed in a door sash; a bend lip projected from the installation member to be contacted with an inner surface of a door glass; and a seal member connected to the installation member having a sash engaging wall connected to the installation member, an outer lip and an inner lip projected from each side of the sash engaging wall, and a seal wall which connects each tip end of the outer lip and the inner lip for sealingly holding the edge of the door glass, an interior angle between the sash engaging wall and the inner lip being obtuse angle.

8 Claims, 4 Drawing Sheets

DOOR GLASS WEATHER STRIP FOR VEHICLES

BACKGROUND OF THE INVENTION

This invention relates to a door glass weather strip for a door sash of a vehicle.

An arrangement of the conventional door glass weather strip 1 is shown in FIG. 1. FIG. 1 is a cross-sectional view of a conventional weather strip taken along the line A—A of FIG. 8. This arrangement is disclosed by Japanese Utility Model Application (OPI) No. 156522/1987 (the term "OPI" as used herein means an "unexamined published application").

The conventional weather strip shown in FIG. 1 comprises an installation member 3, a seal member 11, and a bend lip 23.

The installation member 3 is substantially U-shaped in cross section. A plurality of clamping lips 7 are extended from inner surface of the U-shaped installation member 3 for clamping a flange 5 of the door sash. In FIG. 1, numeral 9 designates a metal plate-like insert which is embedded in the U-shaped installation member 3.

The seal member 11 is connected to an outer free end portion of the installation member 3 through a connecting portion 13. The seal member 11 is substantially trapezoid-shaped in cross section and comprises a sash engaging wall 17 which is connected to the connecting portion 13 and in contact with a frame member 15 of the door sash, a pair of lips (that is, an outer lip 18 which is provided to outside of the vehicle and an inner lip 19 which is provided to inside of the vehicle) which are projecting from each side of the surface of the sash engaging wall 17, and a seal wall 21 which bridges a free end portion of the outer lip 18 and that of the inner lip 19. The sash engaging wall 17, the outer lip 18 and the inner lip 19 are made of a solid rubber and the seal wall 21 is made of a sponge rubber. An interior angle between the sash engaging wall 17 and the inner lip 19 is an acute angle.

The bend lip portion 23 is provided to an outer shoulder portion of the U-shaped installation member 3 and is formed so as to extend in oblique and upper direction. A groove formed between the bend lip 23 and the installation member 3 is used for draining of rainwater and the like.

With respect to the above-mentioned weather strip 1, as shown in FIG. 2, when the door glass 25 is closed, the peripheral edge of the door glass 25 is in contact with the seal wall 21. In addition, the seal wall 21 is elastic deforming and pulls the outer lip 18 and the inner lip 19 thereby holding the both surfaces of the edge of the door glass 25 so as to seal a gap formed between the door glass 25 and door sash.

There are some prior arts relating to the present invention such as Japanese patent application (OPI) No. 43823/1988, Japanese Utility Model Examined Publication No. 42572/1987, Japanese Utility Model Application (OPI) No. 196716/1988, and Japanese Utility Model Application (OPI) No. 5451/1988 and so on.

Since the mounted positions of doors and door glasses may vary, the door glass happens to be offset toward inside of a vehicle. In this case, as shown in FIG. 3, when the door glass 25 is in contact with the seal wall 21, the seal wall 21 is elastic deforming and pulls the outer lip 18 and the inner lip 19. However, the outer lip 18 can not tilt sufficiently toward inside of the vehicle. Because of the inner lip 19 which projects to outside of the vehicle, a top end of the inner lip 19 contacts to an inside surface of the door glass 25 before a top end of the outer lip 18 contacts to an outside surface of the door glass 25. Thereby, the seal wall 21 can not deform and pull the inner lip 19 and outer lip 18 moreover.

To avoid the above-mentioned matter, it is considered that the seal portion 11 should be formed wider in the widthwise direction in order to widen the width of seal wall 21. However, a recent door sash tends to be formed more narrower, it is not desirable to form such the seal portion 11.

As shown in Japanese Utility Model Application (OPI) No. 42919/1989, it is considered that the inner lip 19 is omitted from the arrangement of the weather strip and the seal wall 21 is directly connected to the installation member 3. However, when the seal wall 21 is directly connected to the installation member 3, the installation member 3 intersects to the seal member 11 at right angle so that it is not suitable to produce the weather strip 1 by extrusion. Generally, it is preferable that weather strip 1 should be extruded in the state shown in FIG. 7. After the extrusion, the installation member 3 is bent to form the U-shaped in cross section. Further, when the weather strip 1 is installed to the door sash, the seal portion 11 is bent at the connecting portion 13 to form the weather strip 1 as shown in FIG. 1.

SUMMARY OF THE INVENTION

Accordingly, an object of the present invention is to eliminate the above-mentioned difficulties accompanying a conventional door glass weather strip for vehicles.

The forgoing object and other objects of the invention have been achieved by the provision of a door glass weather strip for vehicles which comprises: an installation member substantially U-shaped in cross-section which is installed in a door sash; a bend lip projected outwardly from a shoulder portion of the installation member to be contacted with an inner surface of the door glass; and a seal member substantially quadrilateral in cross-section which connects at one corner thereof to the installation member through a connecting portion, the seal member in contact with sealingly holding an edge of the door glass; wherein the seal member includes; a sash engaging wall connected to the end portion of the outer wall of the installation member through the connecting portion and in contact with a frame of the door sash; a pair of lips projected from each side of the sash engaging wall, an interior angle between the sash engaging wall and the inner lip being an obtuse angle, the lips being able to tilt corresponding to a movement of the door glass; and a seal wall for sealing and holding the peripheral edge of the door glass, the seal wall bridging a free end of said outer lip and a free end of the inner lip.

DESCRIPTION OF THE PREFERRED EMBODIMENTS OF THE INVENTION

The present invention will now be described with reference to the drawings.

Figure 5:
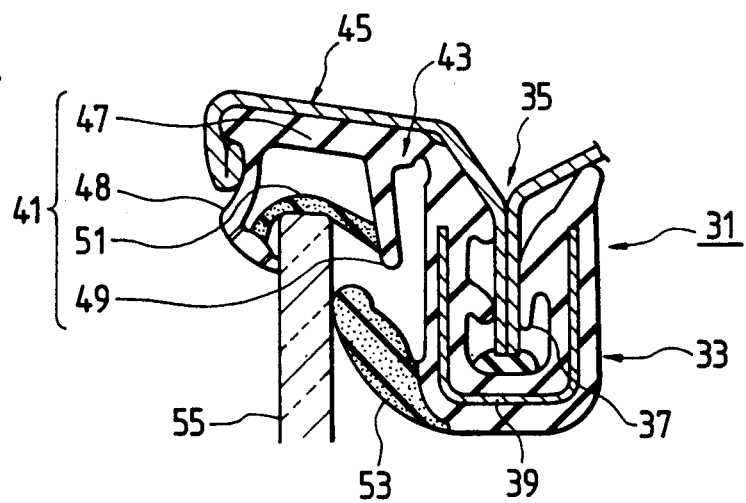
FIG. 5 is a cross-sectional view for description of the operation of the weather strip according to the present invention.
Figure 6:
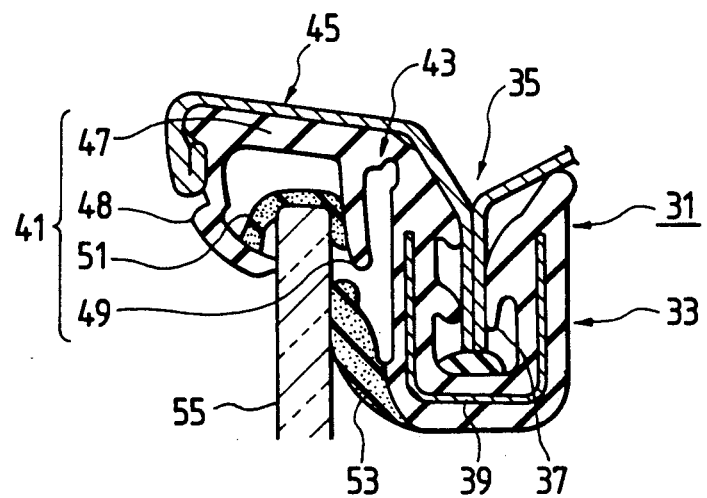
FIG. 6 is a cross-sectional view for description of the operation of the weather strip when the door glass is offset toward the inside of the vehicle.
Figure 7:
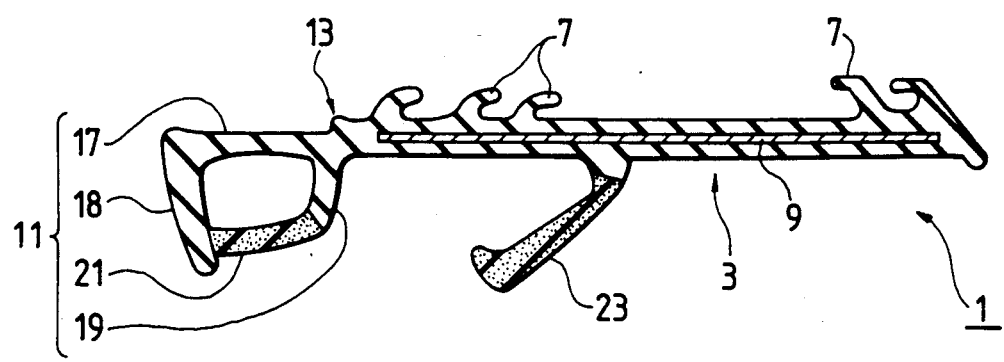
FIG. 7 is a cross-sectional view showing the conventional weather strip formed by extrusion.
Figure 8:
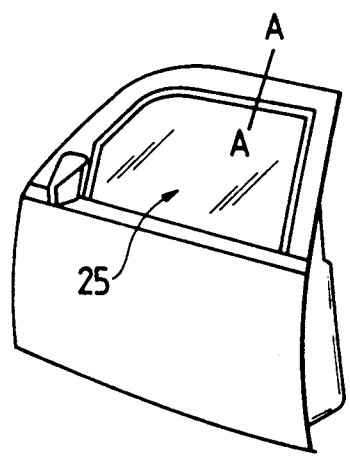
FIG. 8 is a perspective view of a door.

A first embodiment of a door glass weather strip according to the present invention will be described with reference to FIG. 4 through FIG. 6.

In this embodiment, a weather strip 31 comprises an installation member 33, a seal member 41, and a bend lip 53. The installation member 33 is substantially U-shaped in crosssection and clamping lips 37 for clamping a flange 35 of the door sash are formed on an inner surface of the U-shaped installation member 33. Numeral 39 designates a metal plate-like insert which is embedded in the U-shaped installation member 33.

The seal member 41 is connected to an outer free end portion of the installation member 33 through a connecting portion 43. This seal member 41 comprises a sash engaging wall 47 which is connected to the connecting portion 43 and is in contact with a frame member 45 of the door sash, a pair of lips (that is, an outer lip 48 which is provided to outside of the vehicle and an inner lip 49 which is provided to inside of the vehicle) which can tilt in accordance with a tension of a seal wall 51 and is projected from each side of a surface of the sash engaging wall 47, and the seal wall 51 which bridges a free end portions of the outer lip 48 and that of the inner lip 49. The outer lip 48 and the inner lip 49 are made of a solid rubber and the seal wall 51 is made of a sponge rubber.

The bend lip 53 projects from an outer shoulder portion of the U-shaped installation member 33 and is formed so as to extend in the oblique and upper direction.

In this arrangement according to the present weather strip 31, an interior angle between the inner lip 49 and the sash engaging wall 47 is an obtuse angle. Especially, it is preferable that the interior angle is formed within 95°-120°. Due to this arrangement, if the width of the sash engaging wall 47 (that is, the width of the frame portion 45) is kept constant, the width of the seal wall 51 can be provided as broad as possible. Therefore, if the door glass 55 is offset toward the inside of the vehicle, the peripheral edge of the door glass 55 is always contacted to the seal wall 51 and a top end of the inner lip 49 preferentially contacts to the inside surface of the door glass 55 before the outer lip 48 contacts to the outside surface of the door glass 55. Further, in addition to the above mentioned operation, as shown in FIG. 6, if the door glass is offset toward the inside of the vehicle, the top end of the outer lip 48 always preferentially contacts to the outside surface of the door glass 55 and sealing therebetween. In this state, the outer lip 48 can not tilt toward the inside of the vehicle any more, thereby preventing the gap between the top end of the outer lip 48 and the outside surface of the door glass 55 from forming. Therefore, an excellent sealing condition can be obtained.

Figure 9:
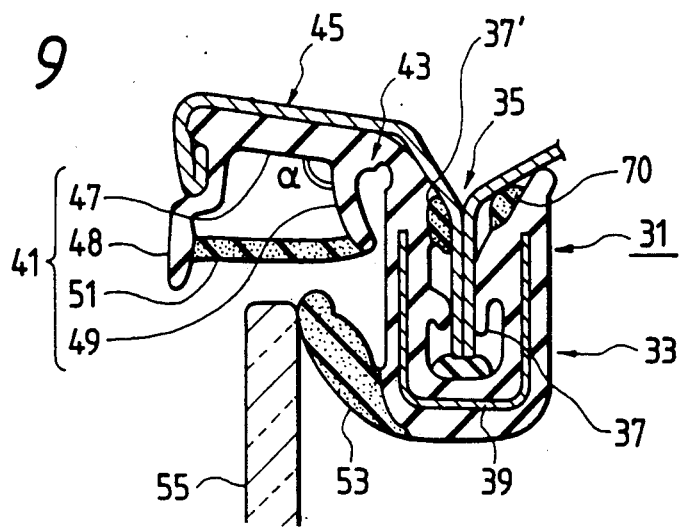
FIG. 9 is a cross-sectional view showing a second embodiment according to the present invention.

A second embodiment of the invention will be described with reference to FIG. 9. The same parts of as those of the first embodiment are designated by the same reference numerals.

Figure 1:
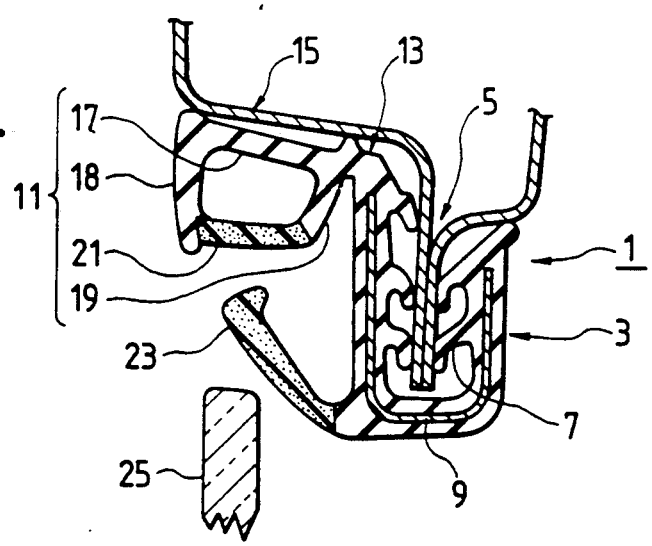
FIG. 1 is a cross-sectional view showing a conventional weather strip taken along the line A—A in FIG. 8.
Figure 2:
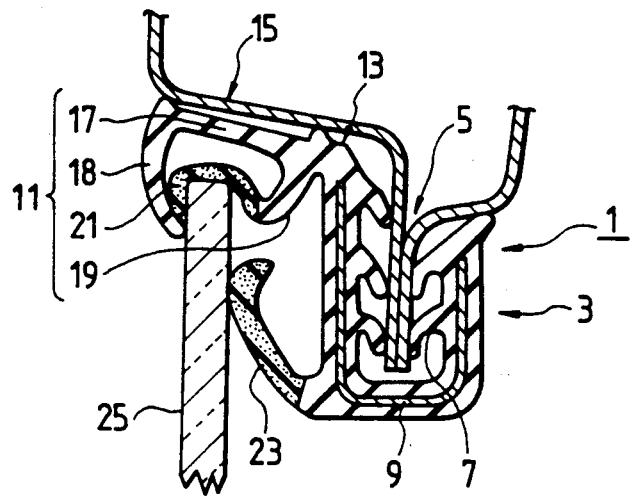
FIG. 2 is a cross-sectional view for description of the operation of the conventional weather strip.
Figure 3:
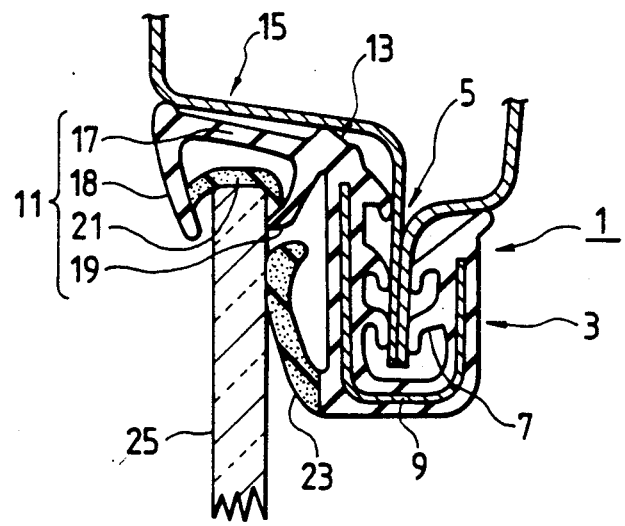
FIG. 3 is a cross-sectional view for description of the operation of the conventional weather strip 1 when the door glass is offset toward the inside of a vehicle.
Figure 4:
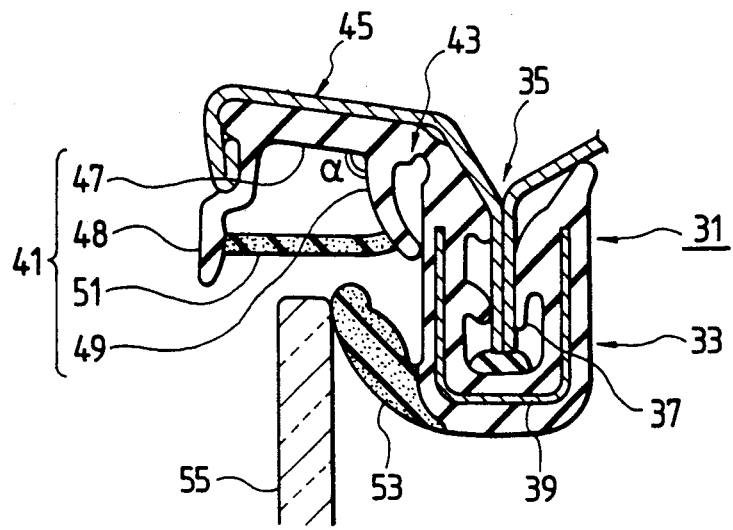
FIG. 4 is a cross-sectional view showing a first embodiment according to the present invention.

The second embodiment is different from the first embodiment shown in FIG. 4 only in that the top end of the inner lip 49 does not protrude from the seal wall 51, the clamping lip 37' which is provided to the outer free end of the U-shaped installation member 33 is made of a sponge rubber, and a lip 70 is provided to the inner free end portion of the U-shaped installation member 33. The operation of the second embodiment is the same as that of the first embodiment shown in FIG. 4 through FIG. 6. With respect to this embodiment, since the top end of the inner lip 49 does not protrude from the seal wall 51, the inner lip 49 is delayed to contact to the inside surface of the door glass 55 so that the inner lip 49 can surely contact to the outside surface of the door glass 55.

Figure 10:
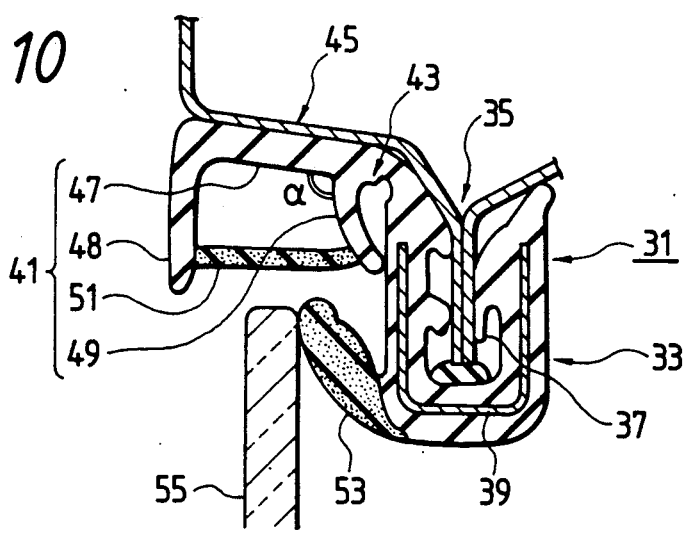
FIG. 10 is a cross-sectional view showing a third embodiment according to the present invention.

A third embodiment of the invention will be described with reference to FIG. 10. The third embodiment is different from the first embodiment shown in FIG. 4 only in that the frame member does not cover the outer lip 48.

Figure 11:
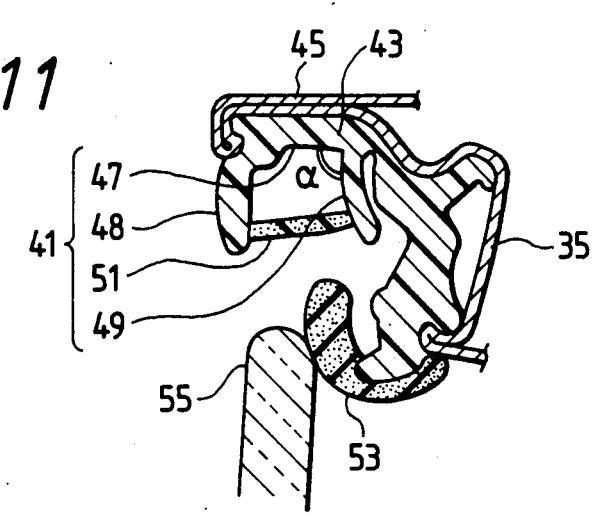
FIG. 11 is a cross-sectional view showing a fourth embodiment according to the present invention.

A fourth embodiment of the invention will be described with reference to FIG. 11.

The fourth embodiment is different from the first embodiment shown in FIG. 4 only in that the installation member 33 does not formed U-shaped in cross-section. In other wards, a door sash (35, 45) formed C-shaped in cross-section is provided so as to hold the seal member 41 and the sash engaging wall 47.

Thus, according to the weather strip 31 of the present invention, even if the door glass 55 is offset toward the inside of the vehicle, the seal wall 51 moves along with this offset. Further, the outer lip 48 is pulled by the tension of the elastic deforming of the seal wall 51 so that the outer lip 48 tilts surely toward inside of the vehicle. Therefore, the gap between the outer lip 48 and the outside surface of the door glass 55 is completely sealed.

In order to pull preferentially the outer lip 48 than the inner lip 49 and in order to tilt surely the outer lip 48, the hardness of the forming material of the inner lip 49 is harder than that of the outer lip 48 and the thickness of the inner lip 49 is thicker than that of the outer lip 48.

As described the above, the weather strip of the present invention is characterized in that the interior angle between the sash engaging wall 47 and the inner lip 49 is an obtuse angle.

Therefore, if the width of the frame portion of the door sash will be kept constant, the width of the sash engaging wall 47 can be provided as broad as possible. Accordingly, if the door glass 55 will be offset toward the inside of the vehicle, the door glass 55 is always received by the seal wall 51. In addition, the inner lip 49 forms to tilt previously toward the inside of the vehicle. Therefore, when the inner lip 49 is pulled by the tension of the elastic deforming of the seal wall 51, the top end of the inner lip 49 contacts to the inner surface of the door glass after the outer lip 48 contacts to the outer surface of the door glass 55.

Accordingly, the movement of the seal wall 51 always corresponds to that of the door glass 25 so that the seal wall 51 preferentially pulls the outer lip 48 and tilts it in contact with the door glass 55.

In other words, in the weather strip of the present invention, the seal function of the seal portion is remarkably improved as compared with the prior art.

What is claimed is:

1. A door glass weather strip for vehicles, comprising:

an installation member to be installed in a door sash;

a bend lip projected from said installation member to be contacted with an inner surface of a door glass; and a seal member connected to said installation member having a sash engaging wall connected to said installation member, an outer lip and an inner lip projected from each side of said sash engaging wall, and a seal wall which bridges a free end portion of said outer lip and a free end portion of said inner lip for sealingly holding an edge of said door glass, an interior angle between said sash engaging wall and said inner lip being an obtuse angle.

2. The door glass weather strip according to claim 1, wherein said interior angle is formed within 95°–120°.

3. The door glass weather strip according to claim 1, wherein said installation member is substantially I-shaped in cross-section having an end portion and a shoulder, said end portion connecting to said sash engaging wall of said seal member, and said installation member installed to be clamped on said sash engaging member and said shoulder by a C-shaped frame of the door sash.

4. A door glass weather strip for vehicles, comprising:

an installation member substantially U-shaped in section, said installation member adapted to clamp the flange of a door sash and having an outer wall and an inner wall;

a bend lip connected to a shoulder portion of said outer wall of said installation member, said bend lip being sealingly connected with an inner surface of the door glass; and a seal member substantially quadrilateral in section which connects at one corner thereof to a free end of said outer wall, said seal member adapted to sealingly hold a peripheral edge of said door glass; wherein said seal member includes, a sash engaging wall connected to said end portion of said outer wall, an outer lip and an inner lip projected from each side of said sash engaging wall, said lips being able to tilt corresponding to a movement of said door glass, and a seal wall provided so as to connect each tip end of said outer lip and said inner lip for sealingly holding said peripheral edge of said door glass, an interior angle between said sash engaging wall and said inner lip being an obtuse angle.

5. The door glass weather strip according to claim 4, wherein said interior angle is formed within 95°–120°.

6. The door glass weather strip according to claim 4, wherein said installation member further comprising, clamping lips provided to an inner circumferential side of said installation member for clamping the flange of said door sash, at least one of said clamping lips being made of a sponge rubber.

7. The door glass weather strip according to claim 4, wherein said inner lip does not protrude from said seal wall.

8. The door glass weather strip according to claim 4, wherein said installation member further comprising, a lip provided to a free end portion of said inner wall.

* * * * *